UNITED STATES PATENT OFFICE.

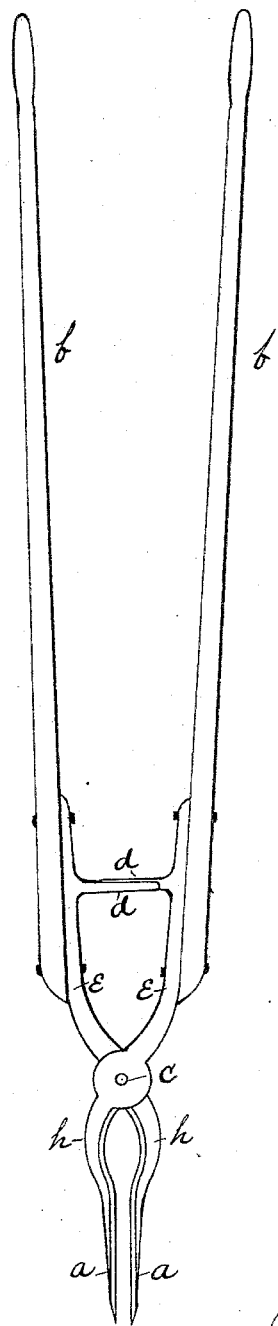

JAMES M. RICKETSON, OF NEW BEDFORD, MASSACHUSETTS.

GRUBBING-PINCHERS.

SPECIFICATION forming part of Letters Patent No. 381,581, dated April 24, 1888.

Application filed December 15, 1886. Serial No. 221,692. (No model.)

*To all whom it may concern:*

Be it known that I, JAMES M. RICKETSON, a citizen of the United States, residing at New Bedford, in the county of Bristol and State of Massachusetts, have invented a new and useful Device for Pulling up Weeds by the Roots, and which I call "Grubbing-Pinchers."

The particular use for which I have designed this device is for the removal of weeds from lawns.

Heretofore in removing weeds from lawns it has been usual for the workman to get upon his knees and use an instrument, like a stout knife or dibble, and in using them it was necessary to make a considerable hole in the turf of the lawn in order to get at the roots of the weed and remove them.

The object of my invention is to provide an implement for removing weeds from lawns, in the use of which the workman can stand upon his feet and pull weeds rapidly without making objectionable holes in or defacing the lawn.

To this end my invention consists in two narrow, flat, and parallel jaws or blades, curved outwardly at their upper ends and then inwardly, and crossing each other, and pivoted together at their intersection, and extending upwardly beyond the pivot into suitable arms for attaching wooden handles, and provided with projections upon their inner sides, the projections being so placed on the said arms that they will pass each other when the arms are brought together, and by means of which the implement may be forced into the ground by means of the foot of the workman.

The accompanying drawing illustrates my invention.

$a\ a$ are the narrow, flat, and parallel blades.

$h\ h$ are the curved and ribbed upper portions of said blades.

$c$ is the pivot on which the blades turn.

$e\ e$ are the elongations of the blades beyond the pivot, to which the handles $f f$ are attached, and $d\ d$ are the projections upon which the foot of the workman is placed in forcing the implement into the ground.

The operation of my device is as follows: The workman takes the implement by the handles $f f$ and places the blades $a\ a$ on each side of and close to the weed to be removed. He then places his foot on the projections $d\ d$ and forces the flat blades $a\ a$ into the ground on each side of the weed. He then presses the handles toward each other and pulls upwardly, which operation removes the weed and its roots from the ground without making an unsightly hole in the lawn.

By the use of this implement weeds can be removed from lawns much more rapidly, easily, and effectually than by any other means. The flat blades $a\ a$ grasp the roots of the weed and bring them out, so that they will not sprout again.

I am aware that heretofore transplanting-instruments have been made of two pivoted handles which cross each other, and having one handle bent to form a foot. I am also aware of a transplanting-instrument having pivoted and curved arms; also, that a transplanting-instrument has been made in which the blades are pivoted and attached to wooden handles; but such is not my invention, and is not claimed by me.

Having thus described my invention, what I claim, and desire to secure by Letters Patent of the United States, is—

The grubbing-pinchers herein described, consisting of two narrow, flat, and parallel blades, having their upper portions curved outwardly and then inwardly, said blades crossing and being pivoted to each other at the point of crossing, and being extended upwardly to form arms for attachment to handles, said arms being provided on their inner sides with projections or foot-pieces so placed as to pass each other when the arms are closed, substantially as described and shown.

JAMES M. RICKETSON.

Witnesses:
 THOS. M. JAMES,
 HENRY W. MASON.